United States Patent [19]

Covert

[11] 4,286,840
[45] Sep. 1, 1981

[54] RETRACTABLE MIRROR

[76] Inventor: Stanley R. Covert, 4508 Sayles Rd., Ionia, Mich. 48846

[21] Appl. No.: 82,291

[22] Filed: Oct. 5, 1979

[51] Int. Cl.³ .............................................. B60R 1/06
[52] U.S. Cl. .................................... 350/289; 350/307
[58] Field of Search ................ 350/289, 307; 248/479, 248/480

[56] References Cited

U.S. PATENT DOCUMENTS

| | | |
|---|---|---|
| 1,031,075 | 7/1912 | Lundin . |
| 2,419,923 | 4/1947 | Tolbert . |
| 2,565,012 | 8/1951 | Barrett . |
| 2,573,443 | 10/1931 | Holland ........................... 350/307 X |
| 3,005,383 | 10/1961 | Pierson ................................. 350/307 |
| 3,059,790 | 10/1962 | Augustus ......................... 350/307 X |
| 3,107,077 | 10/1963 | Lassa . |
| 3,322,388 | 5/1967 | Budreck . |
| 3,612,667 | 10/1971 | Linden ................................. 350/289 |
| 3,625,553 | 12/1971 | Mattioli . |
| 3,671,005 | 6/1972 | Schultz .................................. 248/480 |
| 3,820,877 | 6/1974 | Moyer .................................. 350/289 |
| 3,937,563 | 2/1976 | Frabe .................................. 350/289 |
| 4,050,776 | 9/1977 | Hsu ..................................... 350/289 |
| 4,076,392 | 2/1978 | Suzuki .................................. 350/289 |

FOREIGN PATENT DOCUMENTS

| | | | |
|---|---|---|---|
| 499802 | 1/1939 | United Kingdom ..................... 350/289 |
| 794962 | 5/1958 | United Kingdom ..................... 350/307 |

Primary Examiner—F. L. Evans
Attorney, Agent, or Firm—Price, Heneveld, Huizenga & Cooper

[57] ABSTRACT

The specification discloses a retractable side view mirror comprising an elongate arm adapted to be pivotally mounted on a vehicle for rotation along a substantially horizontal path, and a mirror element attached to the free end of the arm. A mechanically activated pawl is engaged with the arm to positively lock the same in an extended position for rear viewing, and a retracted position for storage, and is disengaged to permit rotation therebetween.

12 Claims, 8 Drawing Figures

RETRACTABLE MIRROR

BACKGROUND OF THE INVENTION

This invention relates to rearview mirrors, and in particular to a retractable side view mirror for vehicles.

Side view mirrors are available for automobiles, trucks, and certain other types of vehicles to permit the driver of the vehicle to observe objects to his rear, such as towed implements, trailing traffic, and the like. When very wide and tall objects are towed behind the vehicle, they often block the line of the sight of the driver through the side view mirror, and thereby render the mirror totally ineffective.

This type of problem is particularly acute in the field of agriculture, because large implements such as grain carts, drawn implements, hay wagons, and the like are commonly towed behind a slow-moving farm tractor. Side view mirrors for such vehicles are preferably adjustable in length so as to extend the mirror outwardly of the implement a distance sufficient to obtain clear vision. Side view mirrors for this purpose are also preferably retractable to permit the tractor and implement to safely pass through narrow paths, such as gate openings, private drives, and the like. Heretofore, such devices were complicated and expensive in construction, inconvenient to operate, and not sufficiently stable to retain the mirror in a steady position. Further, because such devices extend outwardly from the vehicle, they are quite susceptible to being inadvertently hit by an object, such as a fence post, a building, or passing vehicle, thereby causing severe damage to the mirror, and creating a substantial safety hazard.

SUMMARY OF THE INVENTION

The present invention provides a retractable side view mirror for vehicles having a pivotally mounted mirror supporting arm, and a pawl arrangement to positively lock the arm in an extended position for rear viewing, and a retracted position for storage.

Another aspect of the present invention is to provide such a retractable side view mirror, wherein the arm is rotated by an electric motor, the pawl is solenoid operated, and the motor and solenoid are wired in parallel, whereby energizing the motor automatically and simultaneously disengages the pawl to permit rotation of the arm.

Yet another aspect of the present invention is to provide a retractable side view mirror with a pivotally mounted arm, and a clutch selectively transmitting rotational motion to the arm to alleviate damage to the mirror upon inadvertently striking another object.

Yet another aspect of the present invention is to provide a retractable side view mirror for vehicles, comprising an elongate arm pivotally connected with the vehicle by a bracket, and a motor which mechanically rotates the arm and is remotely activated from a cab portion of the vehicle.

These and many other important advantages of the invention will be further understood and appreciated by those skilled in the art by reference to the following written specification, claims, and appended drawings.

DETAILED DESCRIPTION OF THE PREFERRED EMBODIMENTS

Figure 1:
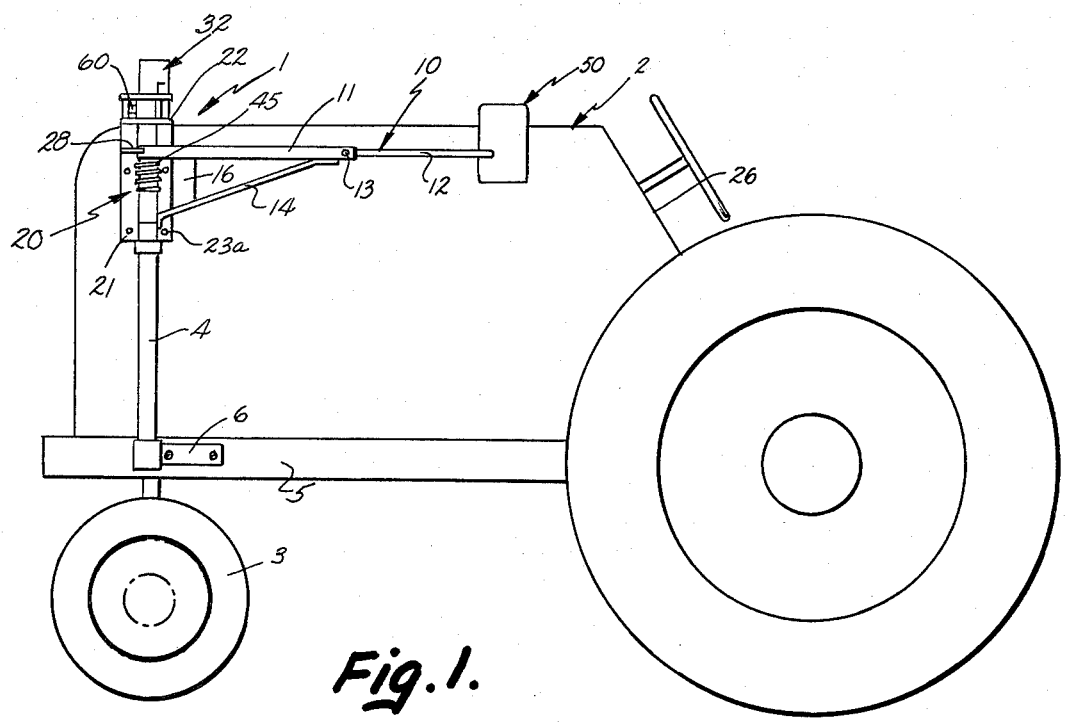
FIG. 1 is a side elevational view of a retractable mirror embodying the present invention, shown connected with a farm tractor, and disposed in a retracted position with respect thereto.
Figure 2:
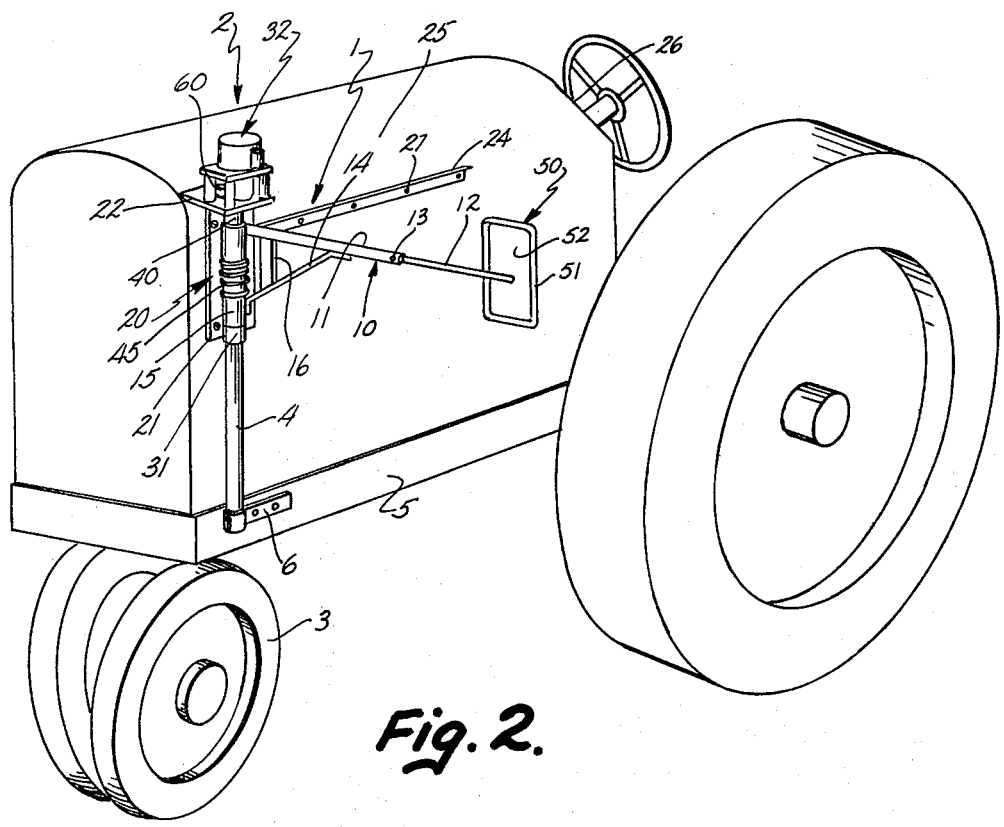
FIG. 2 is a perspective view of the retractable mirror and the tractor, wherein the mirror is shown in an extended position.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary.

The reference numeral 1 (FIGS. 1 and 2) generally designates a retractable side view mirror embodying the present invention, which is adapted for connection with a vehicle 2. The mirror comprises an elongate arm 10 mounted on the vehicle 2 by a bracket 20 for rotation along a substantially horizontal path or plane, and a mirror element 50 mounted on the free end of arm 10. A mechanically activated pawl 60 is engaged with arm 10 to positively lock the same in an extended position (FIG. 2) for rear viewing, and a retracted position (FIG. 1) for storage, and is disengaged to permit rotation of the arm therebetween.

The mirror 1 may be connected with virtually any type of vehicle 2, and is particularly adapted for connection with an off-the-road type of vehicle, designed to tow wide implements therebehind which tend to block the rear view of the driver. In the illustrated example, the mirror 1 is connected with a farm tractor, and permits the user to pull very wide and high implements behind it, such as farm wagons, grain carts, and the like, without blocking the driver's view. The arm 10 of the mirror is elongate to extend beyond the width of the implement so as to insure clear rearview vision, and is also retractable to permit the tractor to safely pass through narrow paths, such as gate opening, private drives, and the like.

The illustrated mirror 1 is attached to the farm tractor 2 at a forward portion of the tractor body, in substantial vertical alignment with the axis of rotation of the front tractor wheels 3. A support column 4 is attached to the side frame rail 5 of the tractor, extends vertically therefrom, and is connected with the mirror 1 to securely support the mirror on the tractor in a manner to be described in further detail hereinafter.

Figure 3:
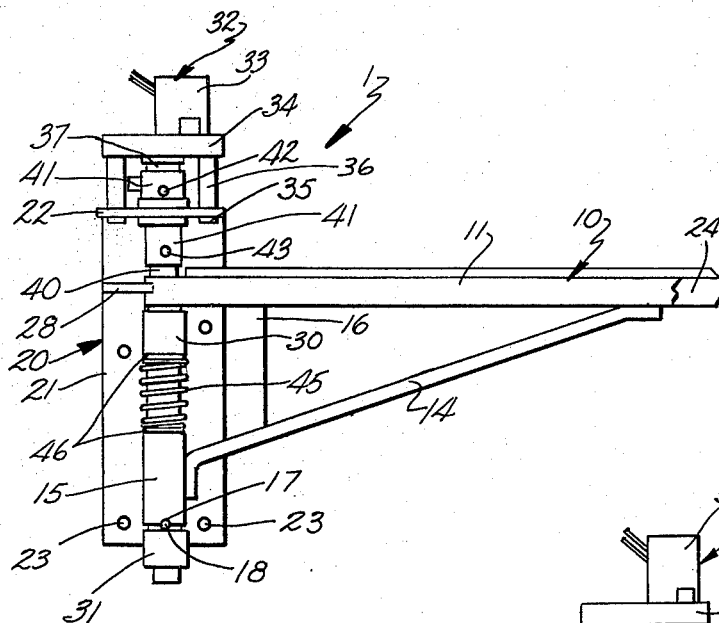
FIG. 3 is a front elevational view of the retractable mirror, shown in a retracted position.

With reference to FIGS. 1 and 2, the illustrated arm 10 is an elongate, rigid structure, having two telescoping portions 11 and 12 with a set screw 13 selectively interconnecting the arm portions. The inner end of the arm 11 includes a vertically oriented aperture (not shown) in which a drive shaft portion 40 of the bracket 20 is received (FIG. 3). The arm aperture is sized to permit arm 10 to rotate freely about the drive shaft 40. Arm 10 also includes an angle bracket 14 (FIGS. 3 and 4) which has one end attached to the inner arm 11 at a point spaced apart from the drive shaft 40. The other end of the angle bracket 14 is connected with a cylindrically shaped sleeve 15 which is aligned axially with the arm aperture, and receives the drive shaft 40 therethrough. A cross brace 16 rigidly interconnects the inner arm 11 and the angle bracket 14 to securely retain the same in the illustrated triangular relationship. The side wall of the sleeve 15 includes a pair of notches 7 on the lower end of sleeve 15 which are aligned and extend diametrically across the sleeve. The notches 17 are substantially semi-circular in shape, and are adapted to mate with the free ends of a pin 18 which extends through the center of the drive shaft 40 and rotates therewith for purposes to be described in greater detail hereinafter.

The mirror 50 (FIG. 2) is rigidly attached to the outer arm 12, and includes a frame 51 having a reflective element 52 securely mounted therein. The reflective element 52 may be either planar or convex, and is adapted to clearly reflect images of objects positioned to the rear of the vehicle.

Figure 4:
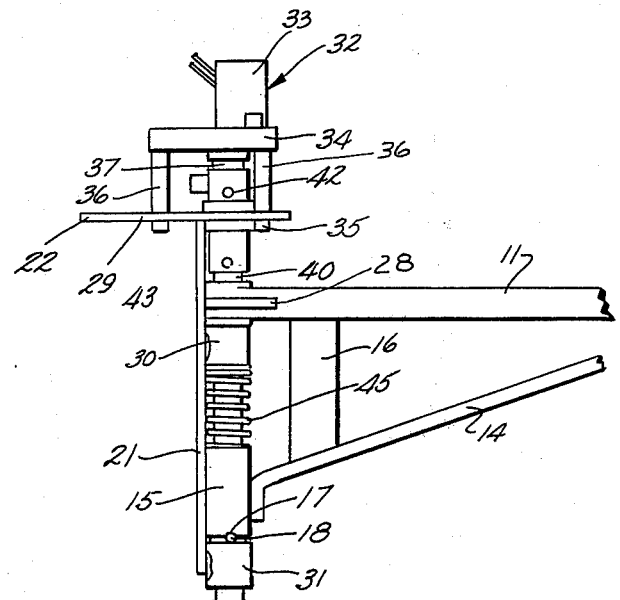
FIG. 4 is a side elevational view of the retractable mirror, shown in the extended position.

With reference to FIGS. 3 and 4, the connecting bracket 20 includes vertical and horizontal support plates 21 and 22 respectively, which are fixedly interconnected in a T-shaped configuration. The vertical plane 21 includes a plurality of regularly spaced apertures 23 through which fasteners 23a (FIG. 1) are received and connect the plate to the side of the vehicle 2. An elongate, L-shaped brace 24 has one end fixedly attached to vertical plate 21, and extends parallel therewith along the tractor cowl 25 toward a cab portion 26 of tractor 2. The brace 24 is securely attached to the tractor 2 by fasteners 27 which are spaced alond the length of the brace. The vertical plate 21 also includes a triangularly shaped stop 28 (FIG. 3) located on the leading side of plate 21. The stop 28 is positioned in the rotational path of arm 10, and is shaped to abut the same and prevent the arm from rotating past the fully extended arm position. The inside leg 29 of horizontal plate 22 is adapted to rest upon and be connected with the tractor cowl 25. The horizontal plate 22 supports a drive assembly 32 thereon which mechanically rotates arm 10 between the extended and retracted positions. The drive assembly 32 includes a conventional, non-step, electric motor 33 connected with a speed reducer 34. The speed reducer 34 is mounted above horizontal plate 22 by fasteners 35 which extend through plate 22, and tubular sleeves 36 are telescopically received over fasteners 35 and act as spacers. The speed reducer 34 includes an output shaft 37 which is oriented downwardly in a substantially perpendicular relationship with the top surface horizontal plate 22. A pair of tubularly shaped sleeves 30 and 31 are fixedly attached to the vertical support plate 21 by means such as welds, and are spaced apart a predetermined distance, and axially aligned to form a bearing in which the drive shaft 40 is rotatably mounted.

The drive shaft 40 is substantially cylindrical in shape, and extends telescopically through the sleeves 30 and 31, and is rotatable therein. The upper end of the drive shaft 40 is attached to the output shaft 37 of speed reducer 34 by a cylindrically shaped connector 41 into the ends of which the shafts are telescopically received. Set screws 42 and 43 attach the connector 41 with output shaft 37 and drive shaft 40 respectively, whereby rotation of the output shaft rotates the drive shaft 40. The connector 41 extends through an aperture (not shown) in the horizontal support plate 22, and in the illustrated example, a bearing 44 is mounted therein to insure alignment of the assembly. The pin 18 extends through the lower portion of drive shaft 40 at a position slightly above the upper surface of the sleeve 31. The pin 19 extends outwardly of the drive shaft side wall, and is substantially cylindrical in shape.

Figure 7:
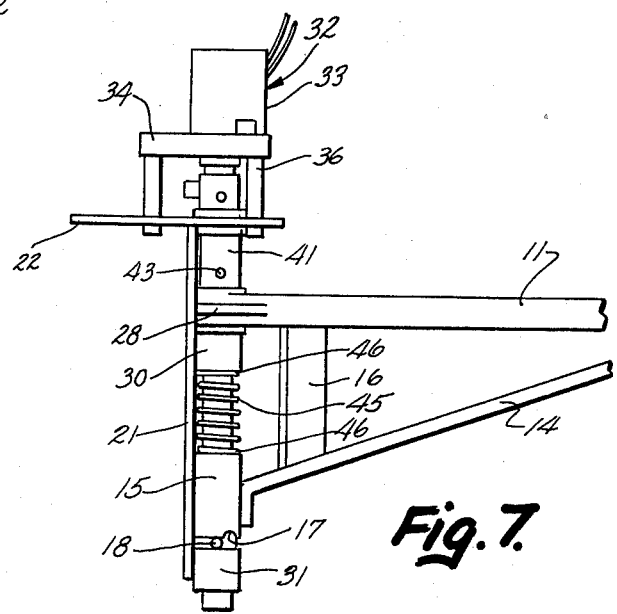
FIG. 7 is a side elevational view of the retractable mirror, particularly showing an arm portion thereof disengaged from a clutched drive portion of the mirror.

The arm 10 is connected with drive shaft 40 by positioning the arm aperture and sleeve 15 in alignment with the sleeves 30 and 31. A coil spring 45 with washers 46 at each end thereof is positioned between the lower end of the sleeve 30 and the upper end of sleeve 15 and is tensed or compressed to enable the same to fit therebetween. Coil spring 45 is positioned coaxially with the sleeves 30 and 31, and the drive shaft 40 is inserted upwardly through the sleeves 30, 15, and 31, as well as the spring 45 and washers 46, and the upper end of the drive shaft is attached to the connector 41. The spring 45 resiliently urges the arm 10 downwardly, whereby the sleeve 15 is retained in abutting engagement against pin 18. The arm 10 is normally positioned in a relationship such that the sleeve notch 17 matingly engages the pin 18, whereby rotation of the drive shaft 40 imparts rotation to the arm 10. However, if an external torque is applied to the arm, such as by inadvertently hitting another object, the pin and notch clutch arrangement permits arm 10 to rotate independently of and with respect to drive shaft 40, as shown in FIG. 7., to prevent severe damage to the mirror assembly as described in greater detail hereinafter. When arm 10 is mounted on drive shaft 40, the inner arm 11 is spaced apart from both the sleeve 30 and the connector 41, such that the arm can reciprocate along the drive shaft. The stop 28 is disposed directly in the rotational path of arm 10, and abuts the same to prevent the arm from rotating past the fully extended position. When arm 10 is fully retracted, it fits under the upper web of brace 24 and overlies the other brace web.

Figure 5:
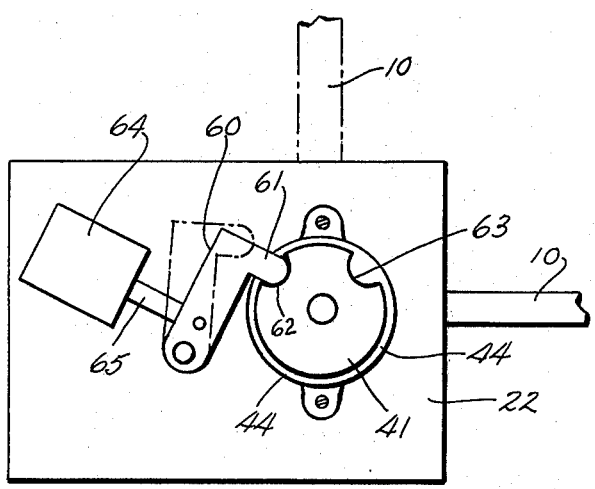
FIG. 5 is an enlarged, partially schematic view of a pawl element of the retractable mirror, with the extended mirror position shown in full lines, and the retracted mirror position shown in broken lines.
Figure 6:
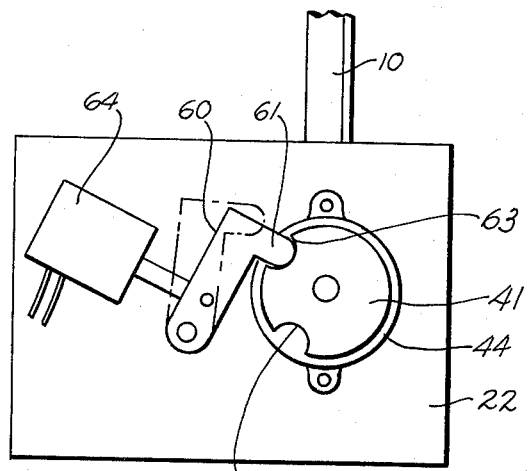
FIG. 6 is another view of the pawl arrangement, shown in the retracted mirror position.

As best illustrated in FIGS. 5 and 6, pawl 60 is pivotally mounted at one end to the upper surface of horizontal support plate 22, and includes a free end 61 which is arcuately shaped to engage one of at least two similarly shaped notches 62 and 63 formed in the side wall of the upper portion of connector 41. The notches 62 and 63 are positioned approximately 90 degrees apart, and in the orientation illustrated in FIGS. 5 and 6, pawl engagement in notch 62 corresponds to the extended arm position, and pawl engagement with notch 63 corresponds with the retracted arm position. The pawl 50 is pivoted by a solenoid 64 which is rotatably connected with a medial portion of the pawl 50, whereby extension of the solenoid shaft 65 pivots free end 61 of the pawl inwardly into engagement with one of the notches 62 and 63, and retraction of shaft 65 withdraws the pawl. The solenoid 64 preferably includes a spring which resiliently urges the shaft 65 outwardly when the solenoid is de-energized, such that the pawl is normally engaged with the arm. The solenoid 64 is preferably activated by a switch (shown schematically at 66 in FIG. 8) mounted in the vehicle cab 26 within the reach of the driver.

Figure 8:
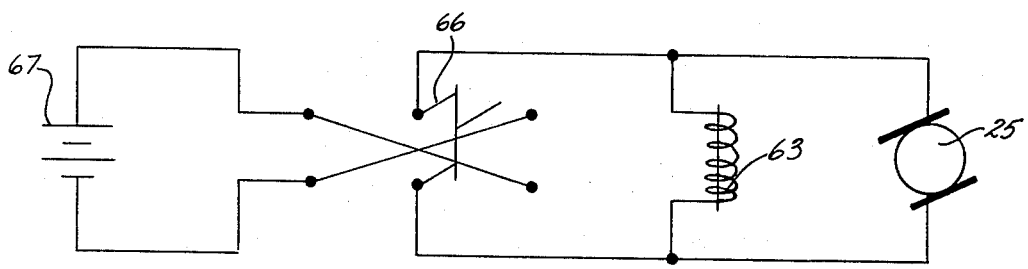
FIG. 8 is a schematic diagram of the electrical interconnection between the various electrical elements of the retractable mirror.

As diagrammatically shown in FIG. 8, the solenoid 63 and electric motor 25 are electrically connected in a parallel relation, whereby energizing motor 25 through the switch 66 automatically and simultaneously activates the solenoid 63 and disengages the pawl 60 from the arm 10 to permit the arm to rotate under the power of the motor. The motor 25 and solenoid 63 are selectively energized by a power source 67, such as the vehicle battery.

In use, the mirror 1 is connected at a convenient location to the vehicle forward of the driver's line of sight. For additional rigidity, the support column 4 is connected with the frame rail 5 of the vehicle by bracket 6. The upper end of the column receives the lower end of the drive shaft 40 therein, and abuts with the sleeve 31, thereby providing vertical support for the mirror. The outer arm member 10 is then adjusted in accordance with the width of the trailed implement and locked in place with set screw 13, such that the driver can see alongside of the implement. The arm 10 is normally retained in the extended position (FIG. 2) for rear view by the pawl 60 engaged in the first notch 62. Should the mirror and/or arm 10 inadvertently hit an object, such as a fence post, building, or the like, the arm will rotate with respect to the drive shaft, as shown in FIG. 7, and thereby avoid serious damage to the mirror assembly. When such an external torque is applied to the arm 10, the force applied to the pin 18 by the sleeve 13 lifts the sleeve 13 as a result of the cylindrical pin and notch shape, and compresses the spring 17 to disengage the pin 16 from the mating notch 14. The arm 10 may be re-engaged with the drive shaft 32 by simply rotating the arm to the fully extended position which the arm originally assumed, wherein the sleeve notch 14 is reengaged with the pin 16 in a snap fashion.

To retract the arm 10, the user manipulates the switch 66, thereby simultaneously energizing the motor 25 and the solenoid 63. The solenoid 63 withdraws the pawl 50 from the notch 52, thereby permitting the motor 25 to rotate the arm rearwardly into the folded or retracted position. When the arm has reached the fully retracted position, the motor 25 is de-energized, whereby the solenoid is simultaneously deactivated and the solenoid spring extends the pawl 60 and engages the same into the notch 63 to lock the arm 10 in the retracted position.

In the foregoing description, it will be readily appreciated by those skilled in the art that many modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A retractable side view mirror for vehicles, comprising:
   mirror means for reflecting an image therein;
   an elongate arm having said mirror means mounted on one end thereof;
   bracket means adapted for connection with said vehicle, and having the other end of said arm pivotally mounted therein for rotation along a substantially horizontal path; said arm having an extended position for rear view by a driver of the vehicle, and a retracted position for folding said arm and mirror inwardly toward the body of the vehicle;
   means for selectively rotating said arm between said extended and retracted positions;
   a pawl mounted on said bracket means, shaped for selective reception in a detent disposed in the other end of said arm, and including means for moving said pawl into said detent to positively lock said arm in at least one of said extended and retracted positions, and out of said detent to permit arm rotation therebetween.

2. A mirror as set forth in claim 1 wherein:
   said pawl moving means comprises a solenoid remotely activated from a cab portion of the vehicle.

3. A mirror as set forth in claim 2, wherein:
   said solenoid has a normally engaged, deactivated position;
   said arm rotating means comprises an electric motor; and
   said solenoid and electric motor are electrically connected in a parallel relation, whereby energizing said motor automatically and simultaneously energizes said solenoid and disengages said pawl from said arm to permit arm rotation by said motor.

4. A mirror as set forth in claim 1, including:
   a clutch connected with said arm and selectively transmitting rotational motion thereto from said rotating means.

5. A mirror as set forth in claim 1 wherein:
   said arm comprises first and second portions telescopically interconnected for adjusting the position of said mirror, and locking means for selectively retaining said arm portions in a predetermined relationship.

6. A mirror as set forth in claim 1, wherein:
   said arm other end includes a second detent positioned for selective engagement with said pawl in the other of said extended and retracted arm positions.

7. A mirror as set forth in claim 6, wherein:
   said first and second named detents are disposed in a cylindrically shaped connector attached to said arm other end.

8. A retractable side view mirror for vehicles, comprising:
   mirror means for reflecting an image therein;
   an elongate arm having said mirror means mounted on one end thereof;
   bracket means adapted for connection with said vehicle, and having the other end of said arm pivotally mounted therein for rotation along a substantially horizontal path alongside the vehicle; said arm having an extended position for rear view by a driver of the vehicle, and a retracted position for folding said arm and mirror inwardly toward the body of the vehicle;
   means for positively and selectively locking said arm in said extended and retracted positions;
   a motor connected with said arm and selectively rotating the same between said extended and retracted positions; and
   means for remotely activating said motor and controlling the rotation of said arm from a cab portion of the vehicle.

9. A mirror as set forth in claim 8, wherein said locking means comprises:
   a remotely operated pawl selectively engaging said arm and positively locking the same in said extended and retracted positions.

10. A mirror as set forth in claim 9, wherein:

said motor is electrically powered;

said pawl is manipulated by a solenoid and has a normally engaged, deactivated position;

said motor and said solenoid are electrically connected in a parallel relation, whereby energizing said motor automatically and simultaneously energizes said solenoid and disengages said pawl from said arm to permit arm rotation.

11. A retractable side view mirror for vehicles, comprising:

mirror means for reflecting an image therein;

an elongate arm having said mirror means mounted on one end thereof;

bracket means adapted for connection with said vehicle, and having the other end of said arm pivotally mounted therein for rotation along a substantially horizontal path; said arm having an extended position for rear view by a driver of the vehicle, and a retracted position for folding said arm and mirror inwardly toward the body of the vehicle;

an electric motor connected with said arm and selectively rotating the same between said extended and retracted positions; and a solenoid activated pawl selectively engaging said arm and positively locking the same in said extended and retracted position; said solenoid activated pawl having a normally engaged deactivated position, and being electrically connected with said motor in a parallel relation, whereby energizing said motor automatically and simultaneously activates said pawl and disengages the same from said arm to permit arm rotation.

12. A mirror as set forth in claim 11 including:

means for remotely activating said motor and pawl, and controlling the rotation of said arm from a cab portion of the vehicle.

* * * * *

UNITED STATES PATENT AND TRADEMARK OFFICE
CERTIFICATE OF CORRECTION

PATENT NO. : 4,286,840
DATED : September 1, 1981
INVENTOR(S) : Stanley R. Covert It is certified that error appears in the above—identified patent and that said Letters Patent is hereby corrected as shown below:

Column 3, line 15:

"7" should be --17--

Column 3, line 33:

"plane" should be --plate--

Column 3, line 40:

"alond" should be --along--

Column 4, line 34:

"7.," should be --7,--

Signed and Sealed this

Third Day of November 1981

[SEAL]

Attest:

Attesting Officer

GERALD J. MOSSINGHOFF

Commissioner of Patents and Trademarks